(12) United States Patent
Harder et al.

(10) Patent No.: US 11,340,466 B2
(45) Date of Patent: May 24, 2022

(54) OPTICAL ASSEMBLY FOR HEAD-MOUNTABLE DEVICE

(71) Applicant: Apple Inc., Cupertino, CA (US)

(72) Inventors: Cameron A. Harder, San Francisco, CA (US); David A. Kalinowski, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 16/908,545

(22) Filed: Jun. 22, 2020

(65) Prior Publication Data
US 2021/0026146 A1    Jan. 28, 2021

Related U.S. Application Data

(60) Provisional application No. 62/877,244, filed on Jul. 22, 2019.

(51) Int. Cl.
*G02B 27/01*    (2006.01)

(52) U.S. Cl.
CPC ..... *G02B 27/0176* (2013.01); *G02B 27/0172* (2013.01); *G02B 2027/0174* (2013.01); *G02B 2027/0178* (2013.01)

(58) Field of Classification Search
CPC ........ G02B 27/01; G02B 27/017–0178; G09G 27/0093
See application file for complete search history.

(56) References Cited

U.S. PATENT DOCUMENTS

| | | | |
|---|---|---|---|
| 10,598,942 B1 * | 3/2020 | Richards | G02B 27/0172 |
| 2012/0200477 A1 * | 8/2012 | Fujishiro | G02B 27/0176 345/8 |
| 2017/0045741 A1 * | 2/2017 | Raffle | G02B 27/0172 |
| 2017/0255015 A1 * | 9/2017 | Geng | G02B 6/0005 |
| 2018/0292658 A1 | 10/2018 | Alexander | |
| 2018/0348527 A1 | 12/2018 | Potnis et al. | |

* cited by examiner

*Primary Examiner* — Sanghyuk Park
(74) *Attorney, Agent, or Firm* — BakerHostetler (57) ABSTRACT

Head-mountable devices can include an arrangement of components that include a waveguide that is decoupled from the ability of system loads to be transferred into the waveguide. Such decoupling can be achieved by utilizing an elastic bond with low stiffness to bond certain components together. This allows the system to flex and deform without transferring stress to the waveguide. Such decoupling can also be achieved by selectively bonding in regions that have relatively lower displacements between a support structure and the waveguide. These measures can help preserve component alignment while allowing a head-mountable device to be lightweight and small in size.

20 Claims, 4 Drawing Sheets

OPTICAL ASSEMBLY FOR HEAD-MOUNTABLE DEVICE

CROSS-REFERENCE TO RELATED APPLICATION

This application claims the benefit of U.S. Provisional Application No. 62/877,244, entitled "OPTICAL ASSEMBLY FOR HEAD-MOUNTABLE DEVICE," filed Jul. 22, 2019, the entirety of which is incorporated herein by reference.

TECHNICAL FIELD

The present description relates generally to head-mountable devices, and, more particularly, to assembly arrangements for head-mountable devices, such as eyeglasses.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include audio output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as smart eyeglasses, head-mountable displays, headsets, visors, head-up display, and the like can perform a range of functions that is determined by the components (e.g., sensors, circuitry, and other hardware) included with the wearable device as manufactured. It can be desirable for a head-mountable device to be lightweight and small in size so the user feels a reduced burden while wearing the head-mountable device across a long duration of time. However, it can also be desirable to provide the components of the head-mountable device in a durable and resilient assembly arrangement, so that they components are maintained in a preferred arrangement throughout the span of usage.

In particular, proper operation of display components of a head-mountable device can be sensitive to deformation. For example, where a light projection display element is configured to project light onto a waveguide, the relative alignment of the display element and the waveguide are preferably maintained for optimal performance. Typically, a waveguide can be protected from deformation by isolating the waveguide inside a protective shroud and/or using large structural elements to create high stiffness and strength. However, these measures can result in undesirably heavy and large components.

Head-mountable devices of the present disclosure can provide an arrangement of components that include a waveguide that is decoupled from the ability of system loads to be transferred into the waveguide. Such decoupling can be achieved by utilizing an elastic bond with low stiffness to bond certain components together. This allows the system to flex and deform without transferring stress to the waveguide. Such decoupling can also be achieved by selectively bonding in regions that have relatively lower displacements between a support structure and the waveguide. These measures can help preserve component alignment while allowing a head-mountable device to be lightweight and small in size.

These and other embodiments are discussed below with reference to FIGS. 1-9. However, those skilled in the art will readily appreciate that the detailed description given herein with respect to these Figures is for explanatory purposes only and should not be construed as limiting.

Figure 1:
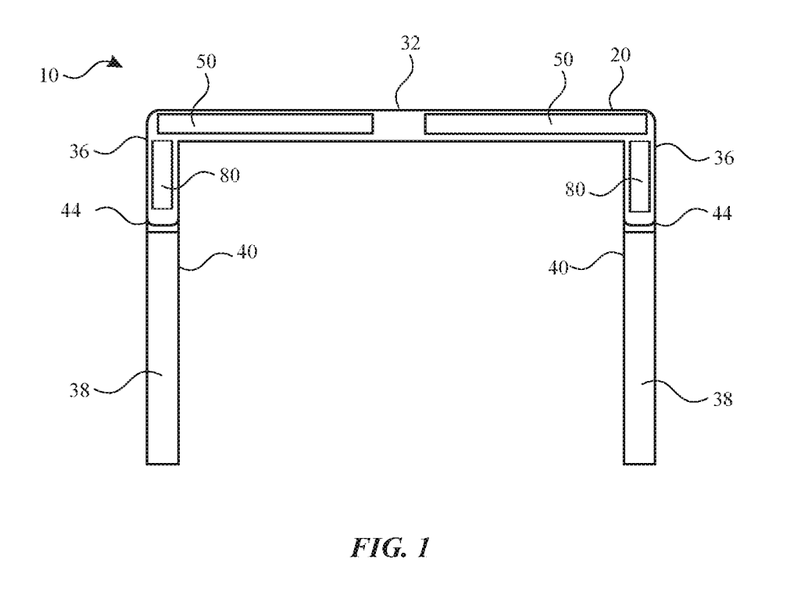
FIG. 1 illustrates a perspective view of a head-mountable device, according to some embodiments of the present disclosure.

According to some embodiments, for example as shown in FIG. 1, a head-mountable device 10 includes a frame 20 that is worn on a head with one or more arms 40. The frame 20 can be positioned in front of the eyes of a user to provide information within a field of view of the user. The frame 20 can provide nose pads or another feature to rest on a user's nose. The frame 20 further includes one or more optical modules 50 and a bridge 32 above the nose pads and connecting multiple optical modules 50.

The frame 20 and/or the arms 40 can serve to surround a peripheral region of the head-mountable device 10 as well as support any internal components in their assembled position. For example, the frame 20 and/or the arms 40 can enclose and support various internal components (including for example integrated circuit chips, processors, sensors, input/output devices, memory devices, and other circuitry) to provide computing and functional operations for the head-mountable device 10, as discussed further herein.

An optical module 50 can transmit light from a physical environment for viewing by the user. Such an optical module 50 can include optical properties, such lenses for vision correction based on incoming light from the physical environment. Additionally or alternatively, an optical module 50 can provide information as a display within a field of view of the user. Such information can be displayed based on operation of a display element 80 that projects light onto and/or communicates with one or more elements of the optical module 50. As shown in FIG. 1, the display element 80 can reside, at least partially, in one or more of the arms 40 and/or in the frame 20. Displayed information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Referring again to FIG. 1, a frame 20 can be supported on a user's head with the arms 40. The arms 40 can wrap or extend along opposing sides of a user's head, as with temple components 36. The arms 40 can further include earpieces 38 for wrapping around or otherwise engaging a user's ears. It will be appreciated that other configurations can be applied for securing the head-mountable device 10 to a user's head. For example, one or more bands, straps, belts, caps, hats, or other components can be used in addition to or in place of the illustrated components of the head-mountable device 10. By further example, an arm can extend about a user's head to both sides of the frame 20.

The frame 20 can be coupled to or integral (e.g., monolithic) with one or more of the arms 40, including the temple components 36 and/or the earpieces 38. For example, a continuous support structure including the frame 20 can support the optical modules 50 as well as the display elements 80. While at least a portion of the arms 40 can optionally move (e.g., the earpieces 38 pivot about a hinge 44 and relative to the temple components 36) with respect to the frame 20, it will be understood that, in at least some embodiments, the frame 20 and/or the arms 40 can form a continuous structure that supports both the optical modules 50 as well as the display elements 80 to facilitate relative alignment of the optical modules 50 and their corresponding display element 80. As such, the arms 40 can refer to at least a portion of the support structure (e.g., temple components 36) that extends away from the portion of the frame 20 and that supports the optical modules 50.

In some embodiments, the display element 80 can include a light projector and the optical modules 50 can each include a waveguide. The display element 80 can include any and all components for projecting light in the desired manner. For example, the display element 80 can include light sources, such as an RGB module, polarizers, beam splitters, collimators, lenses, and the like. The optical modules 50 can include a waveguide that allows internal reflections of received light, as well as one or more other optical components, such as corrective lenses.

Figure 2:
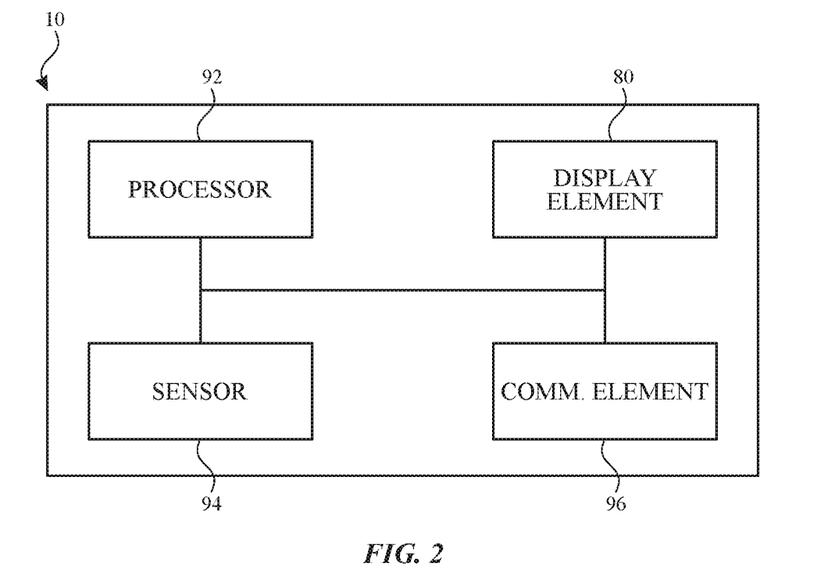
FIG. 2 illustrates a block diagram of a head-mountable device, in accordance with some embodiments of the present disclosure.

Referring now to FIG. 2, components of the head-mountable device can be provided and operatively connected to achieve the performance described herein. FIG. 2 shows a simplified block diagram of a head-mountable device 10 in accordance with one or more embodiments of the disclosure. It will be appreciated that components described herein can be provided on either or both of a frame and/or one or more arms of the head-mountable device 10.

As shown in FIG. 2, the head-mountable device 10 can include a processor 92 with one or more processing units that include or are configured to access a memory having instructions stored thereon. The instructions or computer programs may be configured to perform one or more of the operations or functions described with respect to the head-mountable device 10. The processor 92 can be implemented as any electronic device capable of processing, receiving, or transmitting data or instructions. For example, the processor 92 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The head-mountable device 10 can further include a display element 80 for displaying visual information for a user. The display element 80 can provide visual (e.g., image or video) output. The display element 80 can be or include an opaque, transparent, and/or translucent display. The display element 80 may have a transparent or translucent medium through which light representative of images is directed to a user's eyes. The display element 80 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 10 can include an optical subassembly configured to help optically adjust and correctly project the image-based content being displayed by the display element 80 for close up viewing. The optical subassembly can include one or more lenses, mirrors, or other optical devices, as discussed further herein.

The head-mountable device 10 can include one or more sensors 94. The sensor 94 can be or include a camera for capturing a view of an environment external to the head-mountable device 10. The camera can include an optical sensor, such as a photodiode or a photodiode array, a charge-coupled device (CCD) and/or a complementary metal-oxide-semiconductor (CMOS) device, a photovoltaic cell, a photo resistive component, a laser scanner, and the like. The camera may be configured to capture an image of a scene or subject located within a field of view of the camera.

Additionally or alternatively, the sensor 94 can be or include one or more environment sensors that are directed to an external environment. Such environment sensors can include any sensor that detects one or more conditions in an environment of the head-mountable device 10. For example, an environment sensor 160 can include an imaging device, a thermal sensor, a proximity sensor, a motion sensor, a humidity sensor, a chemical sensor, a light sensor, a magnetometer, a gyroscope, an accelerometer, a global positioning sensor, a tilt sensor, and/or a UV sensor. An environment sensor can be configured to sense substantially any type of characteristic such as, but not limited to, images, pressure, light, touch, force, temperature, position, motion, and so on.

Additionally or alternatively, the sensor 94 can be or include one or more user sensors for tracking features of the user wearing the head-mountable device 10. For example, a user sensor can perform facial feature detection, facial movement detection, facial recognition, eye tracking, user mood detection, user emotion detection, voice detection, etc. Such eye tracking may be used to determine a location of information to be displayed by the display element 80 and/or a portion (e.g., object) of a view to be analyzed by the head-mountable device 10. By further example, the user sensor can be a bio-sensor for tracking biometric characteristics, such as health and activity metrics.

The head-mountable device 10 can include a communication element 96 for communicating with one or more servers or other devices using any suitable communications protocol. For example, the communication element 96 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. The communication element 96 can also include an antenna for transmitting and receiving electromagnetic signals.

The head-mountable device 10 can include one or more other components for supporting operations thereof. For example, the head-mountable device 10 can include a battery (not shown), which can charge and/or power components of the head-mountable device 10. The battery can also charge and/or power components connected to the head-mountable device 10. By further example, the head-mountable device 10 can include an input/output component (not shown), which can include any suitable component for allowing a user to provide input and/or receive output. The input/output component can include, for example, one or more buttons, crowns, keys, dials, trackpads, microphones, speakers, haptic devices, and the like.

Figure 3:
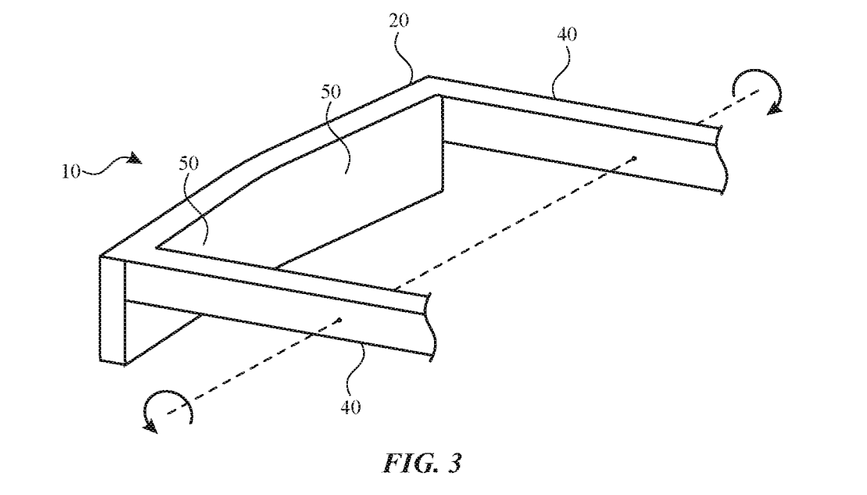
FIG. 3 illustrates another perspective view of the head-mountable device of FIG. 1, according to some embodiments of the present disclosure.
Figure 4:
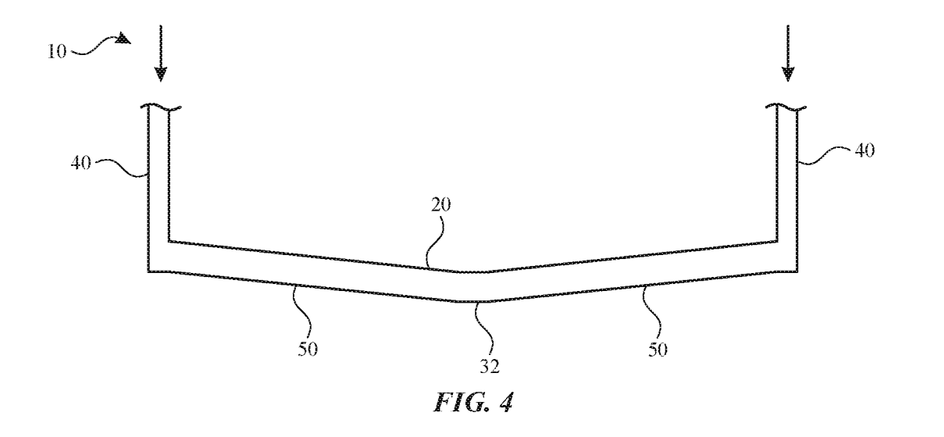
FIG. 4 illustrates a top view of the head-mountable device of FIG. 1, according to some embodiments of the present disclosure.
Figure 5:
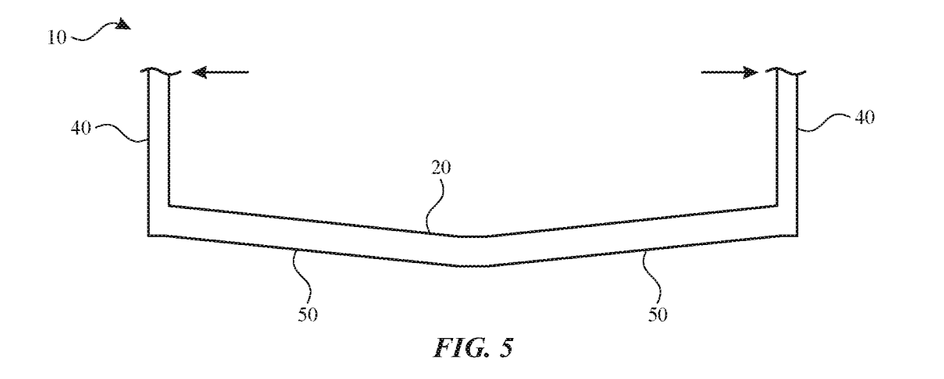
FIG. 5 illustrates another top view of the head-mountable device of FIG. 1, according to some embodiments of the present disclosure.

Referring now to FIGS. 3-5, a head-mountable device can be provided with an arrangement that is resilient to a variety of loads (e.g., force, torque, stress) applied thereto. In particular, forces applied to different portions of a head-mountable device in different directions can cause displacement between the frame and the optical module thereof. Such displacement can further cause displacement between a display element in the frame and a waveguide in the optical module.

For example, as shown in FIG. 3, a torque can be applied to the head-mountable device 10, for example at one or both of the arms 40 and about an axis that extends through one or both of the arms 40. Such a torque can occur when the head-mountable device 10 is removed from a head of the user from one side before the other. A torque applied to one or more of the arms 40 can be transferred to the frame 20 in a manner that twists the frame 20 relative to one or more of the optical modules 50 supported by the frame 20.

By further example, as shown in FIG. 4, forces can be applied to the head-mountable device, for example when the arms 40 are pressed toward the frame 20 while a portion of the frame 20 supports a load in an opposite direction. Such forces can be transferred to the frame 20 such that the frame 20 tends to bend about a portion thereof, such as the bridge 32, thereby distorting the frame 20 relative to the optical modules 50 supported by the frame 20.

By further example, as shown in FIG. 5, yet other forces can be applied to the head-mountable device, for example when the arms 40 are separated away from each other. Such forces can occur when the head-mountable device 10 is resting against the sides of a user's head and/or when the head-mountable device 10 is placed on or removed from the head. Such forces can be transferred to the frame 20 such that the frame 20 tends to bend about a portion thereof, thereby distorting the frame 20 relative to the optical modules 50 supported by the frame 20.

Figure 6:
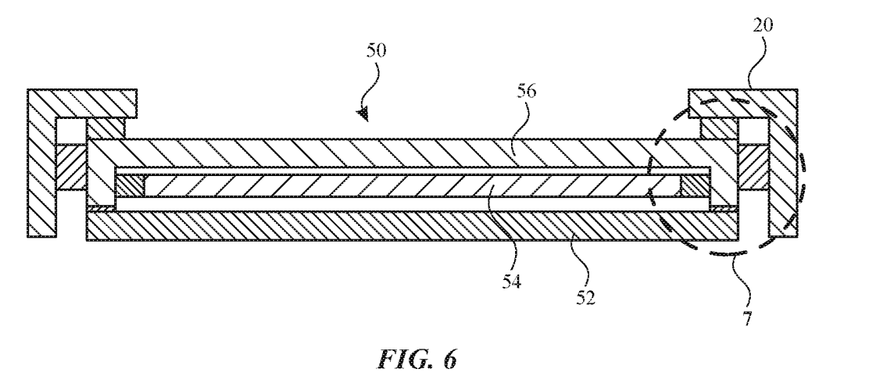
FIG. 6 illustrates a sectional view of an optical assembly of the head-mountable device of FIG. 1, according to some embodiments of the present disclosure.
Figure 7:
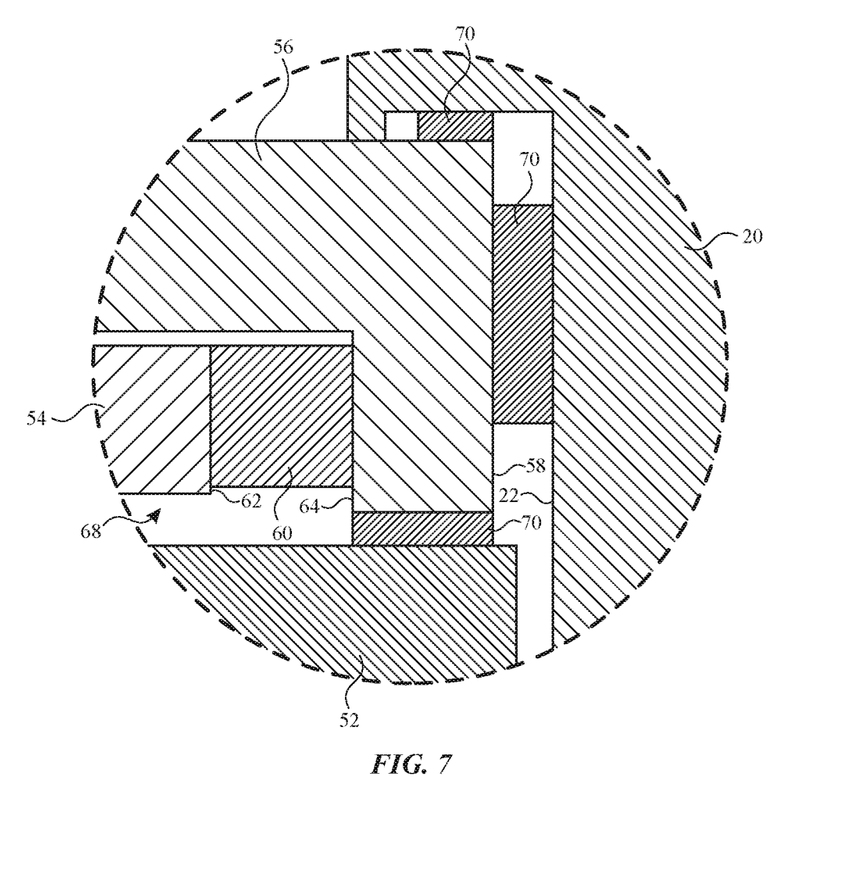
FIG. 7 illustrates an enlarged view of a portion of the optical assembly of FIG. 6, according to some embodiments of the present disclosure.

Referring now to FIGS. 6 and 7, a head-mountable device can provide an arrangement of components that include a waveguide that is decoupled from the ability of system loads to be transferred into the waveguide. Such decoupling can be achieved by utilizing an elastic bond with low stiffness to bond certain components together and absorb loads applied thereto. This allows the system to flex and deform without transferring stress to the waveguide.

As shown in FIG. 6, an optical module 50 can include a waveguide 54 between an inner lens 56 and an outer lens 52. The inner lens 56 can be positioned on a user side of the optical module 50 (e.g., facing toward the user when the head-mountable device is worn), and the outer lens 52 can be positioned on a world side of the optical module 50 (e.g., facing away from the user when the head-mountable device is worn).

The waveguide 54 can receive light from a display element, as discussed further herein. The inner lens 56 can provide a window or other structure for transmitting light from the display element, through the inner lens 56, and to the waveguide 54. The waveguide 54 can include reflective surfaces. When the light enters the waveguide 54, it can strike a first surface with an angle of incidence greater than the critical angle above which total internal reflection occurs. The light may engage in total internal reflection and bounce between opposing surfaces until it reaches a viewing area. At the viewing area, the light can exit the waveguide 54 (e.g., at an angle less than the critical angle). While the waveguide 54 of FIG. 6 is shown as generally rectilinear, it will be understood that a variety of shapes and sizes can be provided to achieve the results discussed herein.

The inner lens 56 can apply optical effects to light transmitted from the waveguide 54 and to the user. For example, the inner lens 56 can be a negative or diverging lens. A given beam of light from the waveguide 54, after passing through the inner lens 56, can appear to emanate from a particular point beyond the inner lens 56 and/or the optical module 50 (e.g., from the external environment).

The outer lens 52 can also apply optical effects to light transmitted from an external environment and to the user. It will be recognized that, where the light from the waveguide 54 is superimposed on a view of an external environment, the inner lens 56 can apply an effect to both light from the waveguide 54 and the light from the external environment. While the effect of the inner lens 56 on the light from the waveguide 54 can be desirable, it can also be desirable to deliver light from the external environment with no net optical effect or with a different optical effect than would be provided by the inner lens 56 alone. As such, the outer lens 52 can apply an optical effect that negates, offsets, complements, or otherwise alters the effect of the inner lens 56 on incoming light from the external environment. For example, the outer lens 52 can be a positive or converging lens. A given beam of light from the external environment can pass through the outer lens 52 and receive a first optical effect. The same beam of light can further pass through the waveguide 54 and the inner lens 56 to arrive at the eye of the user with the intended optical effect.

It will be understood that the components of the optical module 50 can provide vision correction to incoming light as appropriate for a given user, for example, with the outer lens 52 and/or the inner lens 56. Such correction can be spherical, aspheric, atoric, cylindrical, single vision, multifocal, progressive, and/or adjustable. It will be understood that the components of the optical module 50 can include other optical components as required to produce a desired optical effect. For example, the outer lens 52, the waveguide 54, the inner lens 56, and/or another optical component can include one or more diffusers, filters, polarizers, prisms, beam splitters, diffraction gratings, mirrors, and/or windows. Such components can be positioned at any location adjacent to, within, or outside of the other components of the optical module 50.

As shown in FIG. 7, the components of the optical module 50 can be assembled together in a manner that maintains appropriate alignments. For example, the inner lens 56 and/or the outer lens 52 can be coupled (e.g., bonded) to the frame 20 and/or to each other with a rigid adhesive bond 70. The rigid adhesive bond 70 can be positioned on an inner (i.e., user side) surface, an outer (i.e., world side) surface, and/or a radial surface (i.e., connecting the inner surface and outer surface) of any one or more of the inner lens 56, the outer lens 52, and/or the frame 20. For example, one or more rigid adhesive bonds 70 can couple the inner lens 56 to the frame 20, the inner lens 56 to the outer lens 52, and/or the outer lens 52 to the frame 20. It will be understood that adhesive bonds need not be applied to each pairing of components. For example, as shown in FIG. 7, an outer surface 58 of the inner lens 56 can be bonded to an inner surface 22 of the frame 20, and the outer lens 52 can be bonded to the inner lens 56, even if the outer lens 52 is not directly bonded to the frame 20. Alternatively, the outer lens 52 can be bonded to the frame 20, and the inner lens 56 can be bonded to the outer lens 52, even if the inner lens 56 is not directly bonded to the frame 20 (not shown in FIG. 7).

The inner lens 56 and/or the outer lens 52 can abut a portion of the frame 20 and/or each other directly (e.g., apart from the connection through the rigid adhesive bonds 70). For example, the inner lens 56 and/or the outer lens 52 can be placed against a portion of the frame 20 and/or each other in an assembly step that facilitates alignment of parts while the adhesive is in a liquid state. Such alignment can guide the components to the desired relative position and/or orientation.

One or more of the rigid adhesive bonds 70 can extend about an entire periphery of the inner lens 56 and/or the outer lens 52. For example, the rigid adhesive bonds 70 can each form an annular ring (e.g., of any shape) that seals inner portions and/or components of the optical module 50 from an external environment. Such sealing can prevent or limit infiltration of particles and/or fluids into the inner portions of the optical module 50. For example, the waveguide 54 can be positioned within a cavity formed between the inner lens 56 and the outer lens 52, and the rigid adhesive bonds 70 can isolate the waveguide 54 from the external environment.

As further shown in FIG. 7, the waveguide 54 can be coupled (e.g., bonded) to the inner lens 56 and/or the outer lens 52 with a flexible adhesive bond 60. Whereas the inner lens 56 and/or the outer lens 52 can be rigidly coupled to the frame 20, the flexible adhesive bond 60 can resist transference of loads from the frame 20 into the waveguide 54.

As used herein, the terms "rigid" and "flexible" are relative terms that do not necessarily refer to any absolute measurement of rigidity or flexibility. For example, the rigid adhesive bond 70 can be more rigid than the flexible adhesive bond 60, and the flexible adhesive bond 60 can be more flexible than the rigid adhesive bond 70. As such, the flexible adhesive bond 60 can be relatively flexible, soft, stretchable, elastic, and/or compressible, and the rigid adhesive bond 70 can be relatively rigid, stiff, hard, inelastic, and incompressible. Such characteristics can be attributable, at least in part, to the respective constituent materials. For example, the rigid adhesive bond 70 can be formed by an adhesive that has, in its cured state, a higher modulus of elasticity (e.g., Young's modulus, shear modulus, and/or bulk modulus) than does the adhesive of the flexible adhesive bond 60 in its cured state. Additionally or alternatively, such characteristics can be attributable to the arrangement of the respective bonds. For example, the rigid adhesive bond 70 can provide coupling across a larger amount of surface area to secure the bonded parts, and the flexible adhesive bond 60 can provide coupling across a smaller amount of surface area to allow greater range of relative motion between the bonded parts, as discussed further herein.

The flexible adhesive bond 60 can be positioned on an inner (i.e., user side) surface, an outer (i.e., world side) surface, and/or a radial surface (i.e., connecting the inner surface and outer surface) of any one or more of the waveguide 54, the inner lens 56, and/or the outer lens 52. For example, one or more flexible adhesive bonds 60 can couple the waveguide 54 to the inner lens 56 and/or the outer lens 52. By further example, at least one of the inner lens 56 and/or the outer lens 52 can provide a lip (e.g., including or between inner surface 64 and outer surface 58) to form a recess 68 within which the waveguide 54 can be positioned. The waveguide 54 can be coupled to the corresponding lens by the flexible adhesive bond 60, which can be positioned radially between the waveguide 54 and the corresponding lens. By further example, the flexible adhesive bond 60 can be bonded to an outer (e.g., radially outer) surface 62 of the waveguide 54 and an inner (e.g., radially inner) surface 64 of the inner lens 56 and/or the outer lens 52. While the waveguide 54 is shown as being bonded directly to only the inner lens 56, it will be understood that the waveguide 54 can additionally or alternatively be bonded directly to the outer lens 52.

The waveguide 54 can be coupled to surrounding structures (e.g., the inner lens 56 and/or the outer lens 52) solely through the one or more flexible adhesive bonds 60. For example, the waveguide 54 can be isolated from any direct contact with structures other than the flexible adhesive bonds 60, and all connections to other structures can be provided through only the flexible adhesive bonds 60. Additionally, the waveguide 54 can be connected to the frame 20 through only the corresponding lens (e.g., only the flexible adhesive bonds 60). By allowing only the flexible adhesive bond 60 to couple the waveguide 54 to the corresponding lens, transfer of loads from the frame 20 through the corresponding lens and to the waveguide 54 can be minimized by allowing the flexible adhesive bond 60 to absorb at least a portion of the loads. The waveguide can thereby be at least partially isolated from a load applied by the frame to the lens, with the waveguide being configured to move relative to the frame and the lens.

Figure 8:
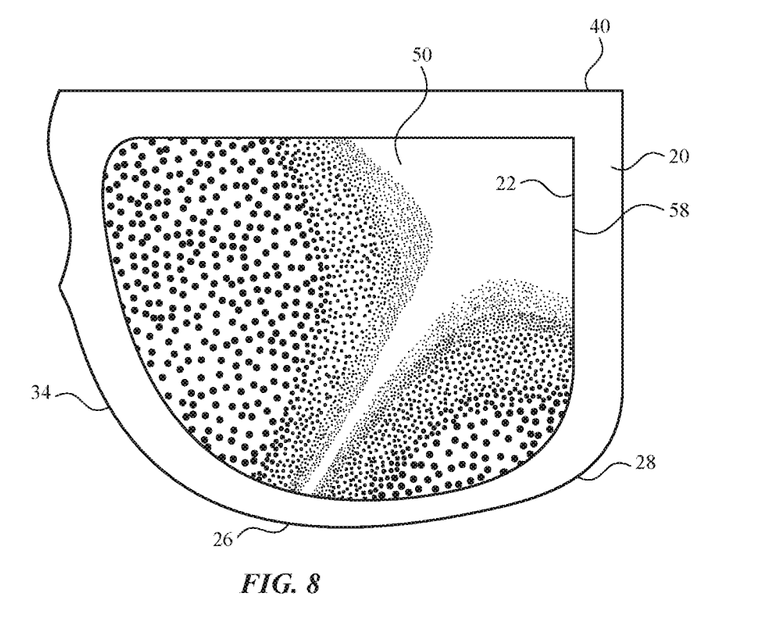
FIG. 8 illustrates a front view of an optical assembly of the head-mountable device of FIG. 1, according to some embodiments of the present disclosure.
Figure 9:
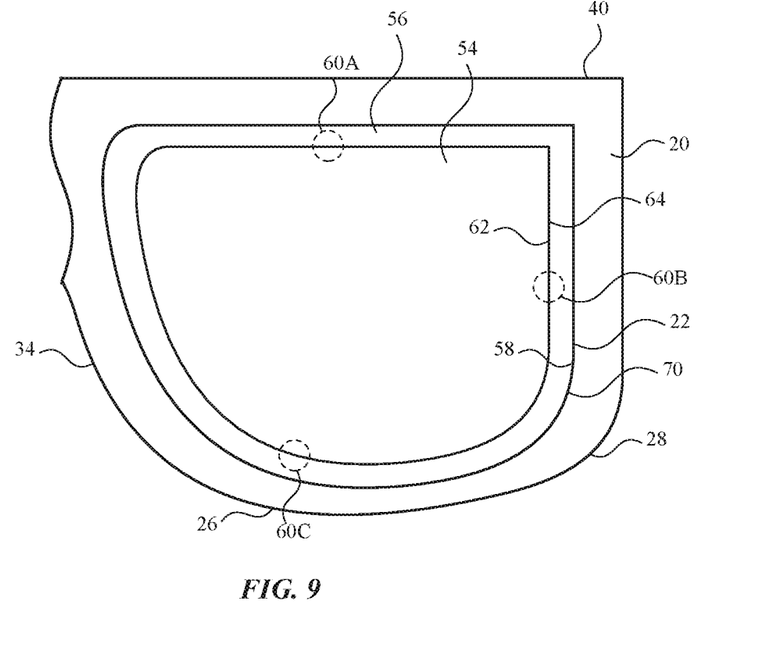
FIG. 9 illustrates a front view of an optical assembly of the head-mountable device of FIG. 1, according to some embodiments of the present disclosure.

Referring now to FIGS. 8 and 9, a head-mountable device can provide an arrangement of components that include a waveguide that is decoupled from the ability of system loads to be transferred into the waveguide by selectively bonding in regions that have relatively lower displacements between a support structure and the waveguide.

As shown in FIG. 8, the optical module 50 can receive loads from deformation of the frame and/or the arms 40. The loads can be transferred to the optical module 50 based on the deformations illustrated herein (e.g., in FIGS. 3-5). The loads can be unevenly distributed across the optical module 50. For example, as shown in FIG. 8, loads can be concentrated along regions of the optical module 50 that are adjacent to the bridge 32, the nose pad, and the outer corner 28, which is across the optical module 50 from the bridge 32. In contrast, regions of the optical module 50 adjacent to the arm 40 and an opposing region 26, which is between the nose pad and the outer corner 28, receive relatively smaller or no loads from the frame 20.

As shown in FIG. 9, the waveguide 54 can be selectively bonded to the corresponding lens (e.g., inner lens 56) at discrete locations that are subject to smaller or no loads. For example, the flexible adhesive bonds 60A, 60B, and 60C can be bonded to an outer (e.g., radially outer) surface 62 of the waveguide 54 and an inner (e.g., radially inner) surface 64 of the corresponding lens (e.g., inner lens 56). By further example, one or more flexible adhesive bonds, such as flexible adhesive bonds 60A and 60B, can be provided at regions of the waveguide 54 that are adjacent to or near the arm. By further example, the flexible adhesive bond 60C can be provided at a region of the waveguide 54 that is adjacent to or near the opposing region 26, which is between the nose pad and the outer corner 28. It will be recognized that yet other flexible adhesive bonds can be provided in discrete locations.

Unlike the flexible adhesive bonds, the one or more of the rigid adhesive bonds 70 between the frame 20 and the inner lens 56 can extend about an entire periphery of the inner lens 56. For example, the rigid adhesive bond(s) 70 can be bonded to an outer (e.g., radially outer) surface 58 of the inner lens 56 and an inner (e.g., radially inner) surface 22 of the frame.

By allowing only the flexible adhesive bonds to couple the waveguide 54 to the corresponding lens, transfer of loads from the frame 20 through the corresponding lens and to the waveguide 54 can be minimized by allowing the flexible adhesive bond 60 to absorb at least a portion of the loads. In other regions, the waveguide 54 can be unbonded, such that the waveguide 54 at those locations can more readily move relative to the corresponding lens (e.g., inner lens 56) when loads are applied thereto. The waveguide 54 can maintain its connection to the corresponding lens (e.g., inner lens 56) via the flexible adhesive bonds while loads are applied. When loads are removed, the waveguide 54 can maintain its original position relative to the corresponding lens.

Accordingly, embodiments of the present disclosure provide a head-mountable device with an arrangement of components that include a waveguide that is decoupled from the ability of system loads to be transferred into the waveguide. Such decoupling can be achieved by utilizing an elastic bond with low stiffness to bond certain components together. This allows the system to flex and deform without transferring stress to the waveguide. Such decoupling can also be achieved by selectively bonding in regions that have relatively lower displacements between a support structure and the waveguide. These measures can help preserve component alignment while allowing a head-mountable device to be lightweight and small in size.

Various examples of aspects of the disclosure are described below as clauses for convenience. These are provided as examples, and do not limit the subject technology.

Clause A: a head-mountable device comprising: a frame; a lens coupled to the frame by a first adhesive bond; and a waveguide coupled to the lens by a second adhesive bond, wherein the second adhesive bond is more flexible than the first adhesive bond so that the waveguide is at least partially isolated from a load applied by the frame to the lens, the waveguide being configured to move relative to the frame and the lens.

Clause B: a head-mountable device comprising: a frame; an arm extending away from the frame; a lens coupled to the frame by a first adhesive bond extending about an entire periphery of the lens that is across from the frame; and a waveguide coupled to the lens by multiple second adhesive bonds that are distributed at discrete locations apart from each other along a periphery of the waveguide that is across from the lens.

Clause C: a head-mountable device comprising: a frame; a lens coupled to the frame and having a lip defining a recess; and a waveguide within the recess and coupled to the lens by only an adhesive bond radially between the waveguide and the lip.

One or more of the above clauses can include one or more of the features described below. It is noted that any of the following clauses may be combined in any combination with each other, and placed into a respective independent clause, e.g., Clause A, B, or C.

Clause 1: the first adhesive bond has a first modulus of elasticity, and the second adhesive bond has a second modulus of elasticity that is lower than the first modulus of elasticity.

Clause 2: the lens is a first lens; the head-mountable device further comprises a second lens; and the waveguide is positioned between the first lens and the second lens.

Clause 3: the first lens is coupled to the second lens by a third adhesive bond that isolates the waveguide from an external environment.

Clause 4: the lens has a lip defining a recess, wherein the waveguide is positioned within the recess.

Clause 5: an arm extending away from the frame; and a display element within the arm and configured to project light onto the waveguide.

Clause 6: at least one of the second adhesive bonds is located at a region of the waveguide that is adjacent to the arm of the head-mountable device.

Clause 7: at least one of the second adhesive bonds is located at a region of the waveguide that is between the bridge and the arm of the frame.

Clause 8: at least one of the second adhesive bonds is located at a region of the waveguide that is between the arm and the outer corner of the frame.

Clause 9: at least one of the second adhesive bonds is located at a region of the waveguide that is between the nose pad and the outer corner of the frame.

Clause 10: a first portion of the waveguide adjacent to the outer corner of the frame and a second portion of the waveguide adjacent to the nose pad are not bonded to the lens and can move relative to the lens upon deformation of the frame.

Clause 11: the waveguide is connected to the frame through only the adhesive bond and the lens.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
   a frame;
   a lens coupled to the frame by a first adhesive bond; and
   a waveguide coupled to the lens by a second adhesive bond, wherein the second adhesive bond is more flexible than the first adhesive bond so that the waveguide is at least partially isolated from a load applied by the frame to the lens, the waveguide being configured to move relative to the frame and the lens.

2. The head-mountable device of claim 1, wherein the first adhesive bond has a first modulus of elasticity, and the second adhesive bond has a second modulus of elasticity that is lower than the first modulus of elasticity.

3. The head-mountable device of claim 1, wherein:
   the lens is a first lens;
   the head-mountable device further comprises a second lens; and
   the waveguide is positioned between the first lens and the second lens.

4. The head-mountable device of claim 3, wherein the first lens is coupled to the second lens by a third adhesive bond that isolates the waveguide from an external environment.

5. The head-mountable device of claim 1, wherein the lens has a lip defining a recess, wherein the waveguide is positioned within the recess.

6. The head-mountable device of claim 1, further comprising:
an arm extending away from the frame; and
a display element within the arm and configured to project light onto the waveguide.

7. A head-mountable device comprising:
a frame defining a bridge, a nose pad, and an outer corner;
an arm extending away from the frame;
a lens coupled to the frame by a first adhesive bond extending about an entire periphery of the lens that is across from the frame; and
a waveguide coupled to the lens by multiple second adhesive bonds that are distributed at discrete locations apart from each other along a periphery of the waveguide that is across from the lens.

8. The head-mountable device of claim 7, wherein at least one of the second adhesive bonds is located at a region of the waveguide that is adjacent to the arm of the head-mountable device.

9. The head-mountable device of claim 7, wherein at least one of the second adhesive bonds is located at a region of the waveguide that is between the bridge and the arm of the frame.

10. The head-mountable device of claim 7, wherein at least one of the second adhesive bonds is located at a region of the waveguide that is between the arm and the outer corner of the frame.

11. The head-mountable device of claim 7, wherein at least one of the second adhesive bonds is located at a region of the waveguide that is between the nose pad and the outer corner of the frame.

12. The head-mountable device of claim 7, wherein a first portion of the waveguide adjacent to the outer corner of the frame and a second portion of the waveguide adjacent to the nose pad are not bonded to the lens and can move relative to the lens upon deformation of the frame.

13. The head-mountable device of claim 7, further comprising a display element within the arm and configured to project light onto the waveguide.

14. A head-mountable device comprising:
a frame;
a lens coupled to the frame and having a lip defining a recess; and
a waveguide within the recess and coupled to the lens by only an adhesive bond radially between the waveguide and the lip.

15. The head-mountable device of claim 14, wherein the waveguide is connected to the frame through only the adhesive bond and the lens.

16. The head-mountable device of claim 14, wherein the adhesive bonds are distributed at discrete locations apart from each other along a periphery of the waveguide.

17. The head-mountable device of claim 14, wherein:
the lens is coupled to the frame by a first adhesive bond;
the adhesive bond is a second adhesive bond; and
the waveguide coupled to the lens by the second adhesive bond, wherein the second adhesive bond is more flexible than the first adhesive bond.

18. The head-mountable device of claim 14, further comprising:
an arm extending away from the frame; and
a display element within the arm and configured to project light onto the waveguide.

19. The head-mountable device of claim 14, wherein:
the lens is a first lens;
the head-mountable device further comprises a second lens; and
the waveguide is positioned between the first lens and the second lens.

20. The head-mountable device of claim 19, wherein the first lens is coupled to the second lens by a second adhesive bond that isolates the waveguide from an external environment.

* * * * *